(12) United States Patent
Martiniak et al.

(10) Patent No.: US 11,600,081 B2
(45) Date of Patent: Mar. 7, 2023

(54) LANE RECOGNITION FOR AUTOMOTIVE VEHICLES

(71) Applicant: VALEO VISION, Bobigny (FR)

(72) Inventors: Julien Martiniak, Bobigny (FR); Rezak Mezari, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/291,473

(22) PCT Filed: Nov. 7, 2019

(86) PCT No.: PCT/EP2019/080584
§ 371 (c)(1),
(2) Date: May 5, 2021

(87) PCT Pub. No.: WO2020/094805
PCT Pub. Date: May 14, 2020

(65) Prior Publication Data
US 2022/0004780 A1 Jan. 6, 2022

(30) Foreign Application Priority Data

Nov. 9, 2018 (EP) .................................... 18205531

(51) Int. Cl.
G06V 20/56 (2022.01)
G06T 7/70 (2017.01)
G06V 10/141 (2022.01)
B60Q 1/00 (2006.01)
B60Q 1/50 (2006.01)
H04N 5/04 (2006.01)
H04N 5/232 (2006.01)

(52) U.S. Cl.
CPC .......... G06V 20/588 (2022.01); B60Q 1/0023 (2013.01); B60Q 1/50 (2013.01); G06T 7/70 (2017.01); G06V 10/141 (2022.01); H04N 5/04 (2013.01); H04N 5/23245 (2013.01); G06T 2207/30256 (2013.01)

(58) Field of Classification Search
CPC .......... G06T 7/70; B60Q 1/0023; B60Q 1/50; H04N 5/04
USPC ........................................................ 348/148
See application file for complete search history.

(56) References Cited

U.S. PATENT DOCUMENTS

| 2014/0267415 A1 | 9/2014 | Tang et al. |
| 2018/0009374 A1 | 1/2018 | Kim et al. |
| 2018/0361917 A1 | 12/2018 | Kim et al. |

FOREIGN PATENT DOCUMENTS

EP 3 248 838 A1 11/2017

OTHER PUBLICATIONS

International Search Report dated Feb. 19, 2020 in PCT/EP2019/080584 filed on Nov. 7, 2019, citing documents AA-AC and AO therein, 2 pages

*Primary Examiner* — On S Mung
(74) *Attorney, Agent, or Firm* — Oblon, McClelland, Maier & Neustadt, L.L.P.

(57) ABSTRACT

The present invention relates to a lighting system 200 of an automotive vehicle comprising: —an image capture device (205) configured to acquire an image (I) of a road (R) of travel of the vehicle, said road (R) comprising lanes marked on the road (110); —a lighting module (215) configured to project road markings on the road (120); wherein said lighting system (200) is configured to filter the projected road markings (120) on the road compared to the lanes marked (110) on the road.

25 Claims, 8 Drawing Sheets

LANE RECOGNITION FOR AUTOMOTIVE VEHICLES

TECHNICAL FIELD

The present invention relates to vehicles, in particular, it relates to a lighting system and synchronization method for providing driving assistance to the vehicles.

STATE OF THE ART

Today, the automotive vehicles comprise more and more systems to assist the driver in his drive. For example, these systems provide to the driver information about environment such as obstacles, vehicle in blind spot and can assist the driver to stay in his lane or to overtake. Therefore, these systems increase the safety and thus, permit to reduce the number of road accidents. These systems are called Advanced Driver Assistance Systems (ADAS).

Moreover, the automotive vehicles notably evolve towards automated vehicles and autonomous vehicles. In automated vehicle, the management of the control commands can be ensured automatically by a control system for parking operations or driving at low speed for example. In autonomous vehicle, the management of the control commands can be ensured automatically by a control system for all the driving tasks.

In order to implement functions such as lane keeping, lane centring, overtake assistant to assist the driver or to the automated or autonomous vehicle, the ADAS has in particular to detect the road lanes and the road boundaries. Thus, the ADAS are currently equipped with camera able to acquire an image of the road in front of the vehicle and a computation unit able to calculate the position of the lanes marked on the road.

To transmit the information acquired by the camera and calculated by the computation unit to the driver or to the passengers of an automated or autonomous vehicle, the ADAS can comprise a lighting system to display or project on the road several pictograms. As shown in the FIG. 1, the lighting module can display or project lines 120, for example, white lines, on the road in order to show the size of the vehicle or the trajectory of the vehicle when it is overtaking another vehicle or to show safety distance with the other vehicles.

However, when the camera of the ADAS acquires an image of the road whereas the lighting module is projecting lines, the computation unit cannot differentiate the lanes marked on the road and the projected lines. This non-differentiation leads to a safety issue. The information transmitted to the driver or transmitted to the control system of the automated or autonomous vehicle is not accurate. The projecting lines may not be projected on the right position and the driver could fail to identify whether there is enough space to pass or overtake other vehicles, and the control system could fail to centre the vehicle on the road and could make the vehicle oscillate.

SUMMARY OF THE INVENTION

An object of the present invention is to provide a lighting system to improve safety by improving the lanes detection to avoid any confusion between the lanes marked on the road and the road marking projected by a lighting module of the vehicle.

Another object of the present invention is to provide different methods of which a method for synchronizing the operation of a lighting module of the vehicle with the operation of an image capture device of the vehicle to provide driving assistance to automotive vehicles, especially, during low lighting conditions.

In accordance with an embodiment of the present invention, there is a provided a lighting system of an automotive vehicle. The lighting system comprises an image capture device configured to acquire an image of a road of travel of the vehicle, said road comprising lanes marked on the road; a lighting module configured to project road markings on the road; and a control unit, wherein said lighting system is configured to filter the projected road markings on the road compared to the lanes marked on the road.

In an embodiment, the lighting module is configured to project road markings on the road using a pulse light beam.

In an embodiment, the image capture device comprises an image processing unit configured to compute position of lanes marked on the road and said control unit is configured to compute position of road markings to be projected on the road based on the position of lanes marked on the road.

In a first non-limitative embodiment, the control unit is further configured to send said position of road markings to be projected on the road to said image processing unit, and the image processing unit integrates said position of road markings to be projected on the road in order to differentiate between the lanes marked on the road and the projected road markings on the road.

In a second non-limitative embodiment, the lighting module is configured to project road markings on the road using a pulse light beam and the image processing unit is further configured to identify within said image the projected road markings on the road corresponding to the pulse light beam in order to differentiate between the lanes marked on the road and the projected road markings on the road.

In an embodiment, the image processing unit is configured to:
- differentiate pulsed light zones corresponding to projected road markings on the road, of non-pulsed zones corresponding to the lanes marked on the road,
- reject the pulsed light zones,
- remember the non-pulsed zones,
- communicate, to the control unit, information on the non-pulsed zones.

In an embodiment, the image capture device has an acquisition frequency, and the lighting module has a pulsation frequency lower than said acquisition frequency.

In an embodiment, the pulsation frequency is a sub-multiple of the acquisition frequency.

In a third non-limitative embodiment, the control unit is configured to deactivate the lighting module and to activate simultaneously the image capture device on a first mode, and activate the lighting module and to deactivate simultaneously the image capture device on a second mode.

In an embodiment, the image capture device comprises an image processing unit configured to compute position of lanes marked on the road, and the control unit is configured to compute position of road markings to be projected on the road based on the position of lanes marked on the road. Further, the lighting module is configured to project a segmented lighting beam.

In an embodiment, the image capture device operates in a pulsed manner in which acquisition of an image is activated during a predetermined time interval T1 and the acquisition of image is deactivated during a predetermined time interval T2, the time interval T1 is followed by the time interval T2 on a sequential manner. The image capture device is configured to operate in the first mode for the predetermined time interval T1 and in the second mode for the predetermined time interval T2. The image capture device is configured to activate the first mode on a rising edge of a pulse and to activate the second mode on a falling edge of the pulse, the pulse duration corresponding to the predetermined time interval T1.

During the first mode, the image capture device is configured to send a synchronization signal to the control unit on the rising edge of the pulse and the control unit is configured to send a deactivation signal to the lighting module upon receiving the synchronization signal, and the image capture device is configured to acquire image during the time interval T1. During the second mode, the image capture device is configured to send a synchronization signal to the control unit on the falling edge of the pulse and the control unit is configured to send an activation signal to the lighting module upon receiving the synchronization signal, and the lighting module is configured to project road markings on the road during the predetermined time interval T2.

In an embodiment, time periods T1 and T2 are within in a range from about 14 ms to about 66 ms.

In accordance with another embodiment of the present invention, there is also provided a method comprising the following steps:
acquiring an image of a road of travel of the vehicle by the image capture device;
projecting road markings on the road by the lighting module; and
a filtering of the projected road markings on the road compared to the lanes marked on the road.

In a first non-limitative embodiment, the method further comprises:
computing a position of lanes marked on the road by an image processing unit within said image capture device;
computing a position of road markings to be projected on the road based on the position of lanes marked on the road by a control unit.

In an embodiment, the method further comprises:
sending from said control unit said position of road markings to be projected on the road to said image processing unit, and
integrating by said image processing unit said position of road markings to be projected on the road in order to differentiate between the lanes marked on the road and the projected road markings on the road In a second non-limitative embodiment, the method further comprises:
projecting road markings on the road using a pulse light beam by said lighting module;
identifying within said image the projected road markings on the road corresponding to the pulse light beam by an image processing unit within said image capture device in order to differentiate between the lanes marked on the road and the projected road markings on the road.

In accordance with another embodiment of the present invention, there is provided a method for synchronizing an operation of a lighting module of an automotive vehicle with an image-capture device. The method comprises:
acquiring an image of a road of travel of the vehicle by the image capture device; and projecting road markings on the road by the lighting module. The method further comprises deactivating the lighting module by a control unit and simultaneously activating the image capture device on a first mode; and activating the lighting module by the control unit and simultaneously deactivating the image capture device on a second mode.

The method further comprises computing the position of lanes marked on the road, and computing position of road markings to be projected on the road based on the position of lanes marked on the road.

In an embodiment, the method comprises operating the image capture device in a pulsed manner in which acquisition of an image is activated during a predetermined time interval T1 and the acquisition of image is deactivated during a predetermined time interval T2, the time interval T1 is followed by the time interval T2 on a sequential manner. The image capture device is operated in the first mode for the predetermined time interval T1 and operated in the second mode for the predetermined time interval T2.

Further in an embodiment, the operation of the image capture device on the first mode comprising the steps of: sending, by the image capture device, a synchronization signal to the control unit on the raising edge of the pulse; sending, by the control unit, a deactivation signal to the lighting module, upon receiving the synchronization signal; and acquiring the image, by the image capture device during the predetermined time interval T1.

In an embodiment, operating the image capture device in the second mode comprising the steps of: sending, by the image capture device, a synchronization signal to the control unit on the falling edge of the pulse; sending, by the control unit, an activation signal to the lighting module, upon receiving the synchronization signal; and projecting the road markings on the road, by the lighting module, during the predetermined time interval T2.

It is to be noted that all the described embodiments are non-limitative.

Thus, the present invention provides the lighting system and different methods of which a synchronization method for accurately differentiating the lanes marked on the road and road markings projected by the lighting module by synchronising the operations of the lighting module and the image capture device. The accurate differentiation of the marked lanes and the projected road markings enable the driver of the vehicle or the ADAS system to drive the vehicle in the right path in low lighting conditions, thereby accidents can be prevented.

BRIEF DESCRIPTION OF THE INVENTION

To complete the description and in order to provide for a better understanding of the invention, a set of drawings is provided. Said drawings form an integral part of the description and illustrate an embodiment of the invention, which should not be interpreted as restricting the scope of the invention, but just as example of how the invention can be carried out. The drawings comprise the following features.

Figure 3A:
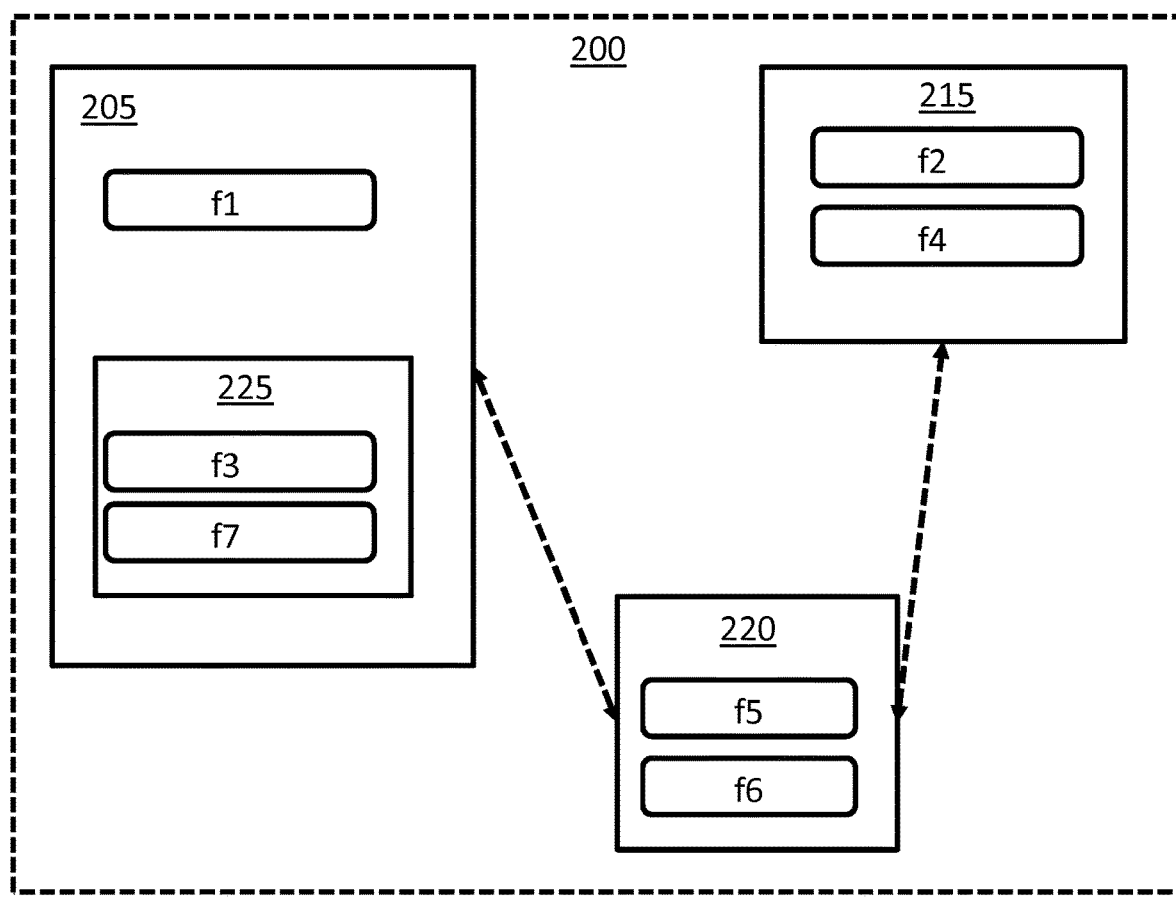
Figure 3B:
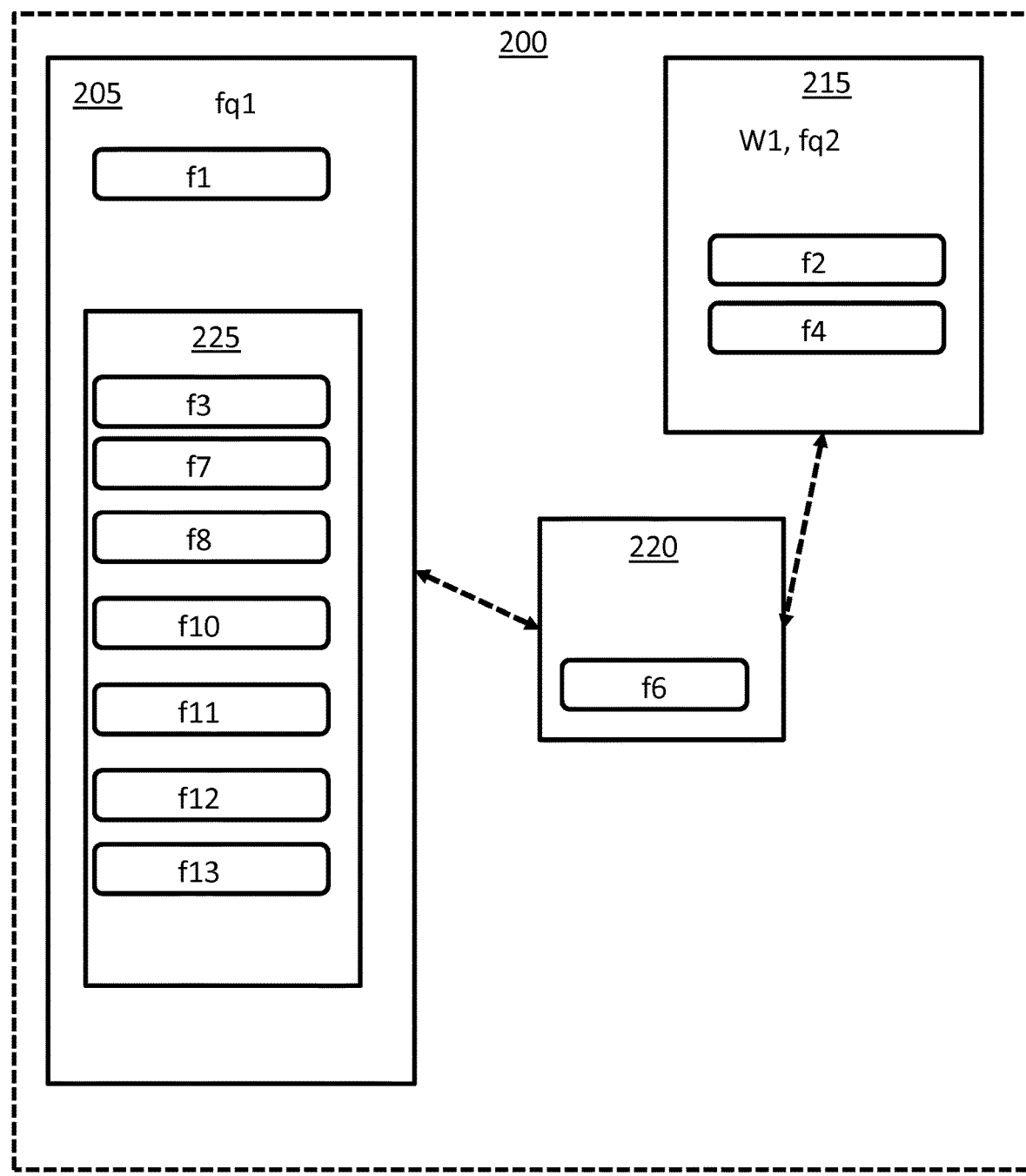
Figure 3C:
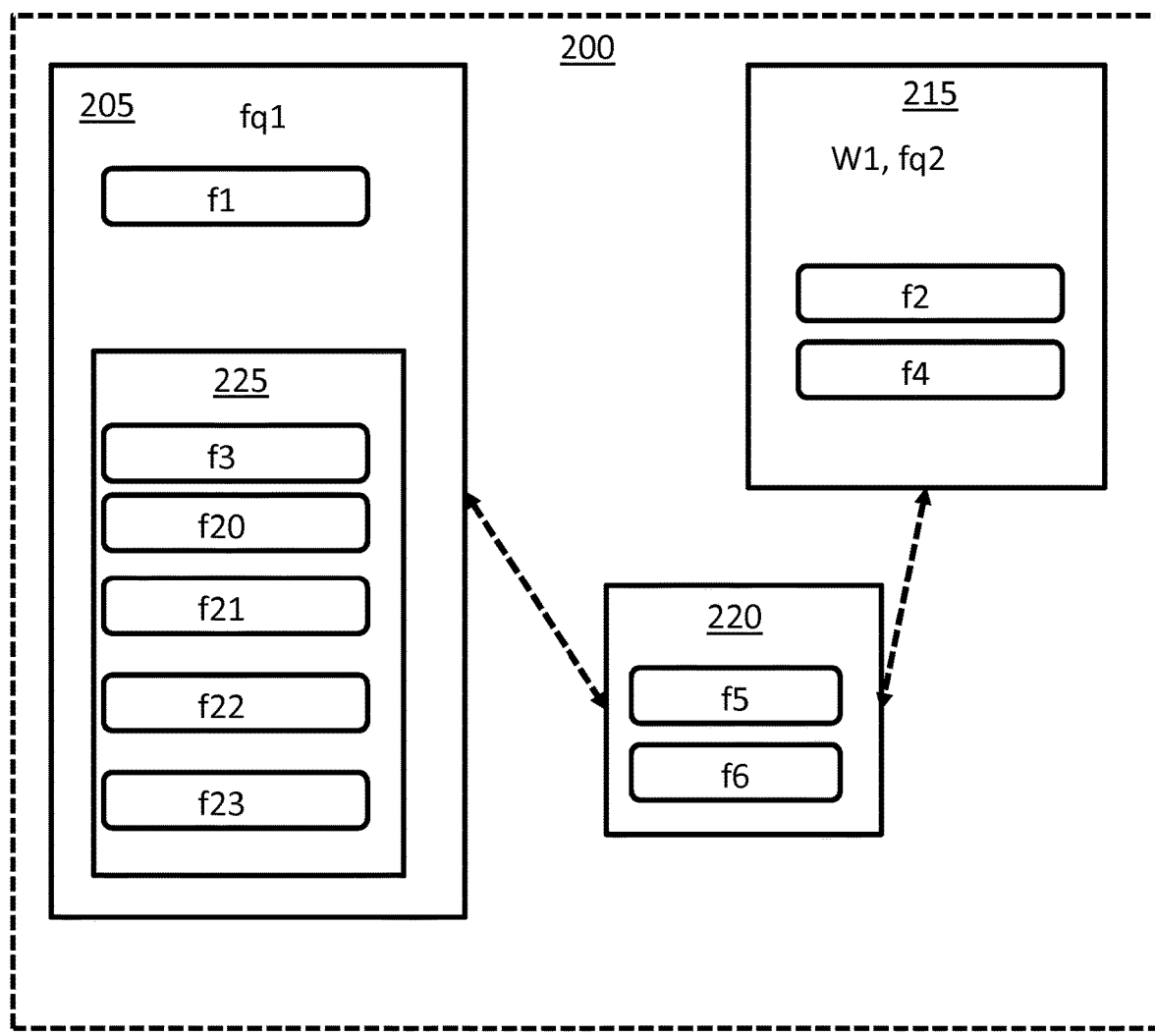
Figure 4:
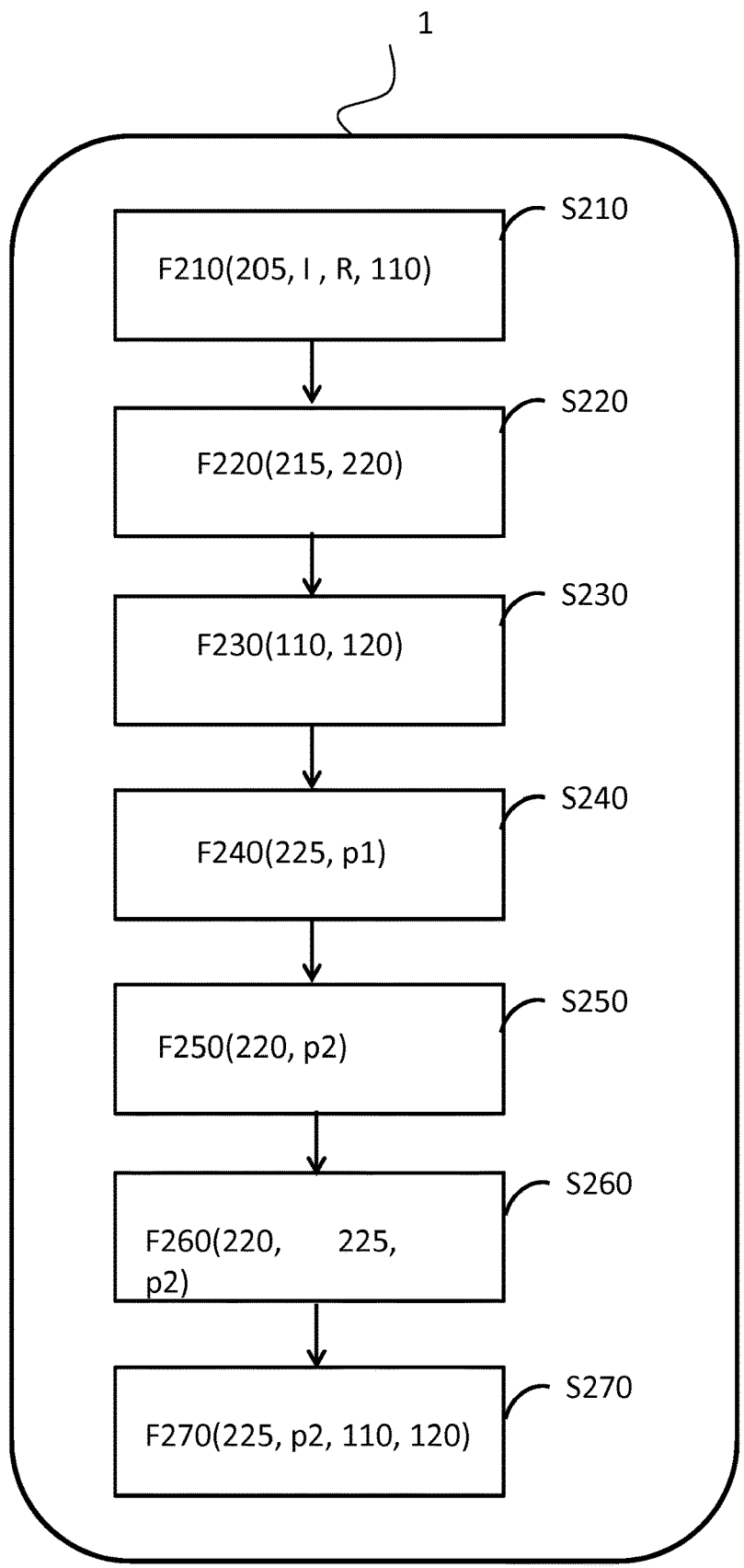

FIG. 3a illustrates the functions of the image capture device, the lighting module and the control unit according to a first non-limitative embodiment, FIG. 3b illustrates the functions of the image capture device, the lighting module and the control unit according to a second non-limitative embodiment, FIG. 3c illustrates the functions of the image capture device, the lighting module and the control unit according to a third non-limitative embodiment, FIG. 4 is a flowchart of a method carried out by the lighting system of FIG. 3a, in accordance with an embodiment of the present invention.

Figure 5:
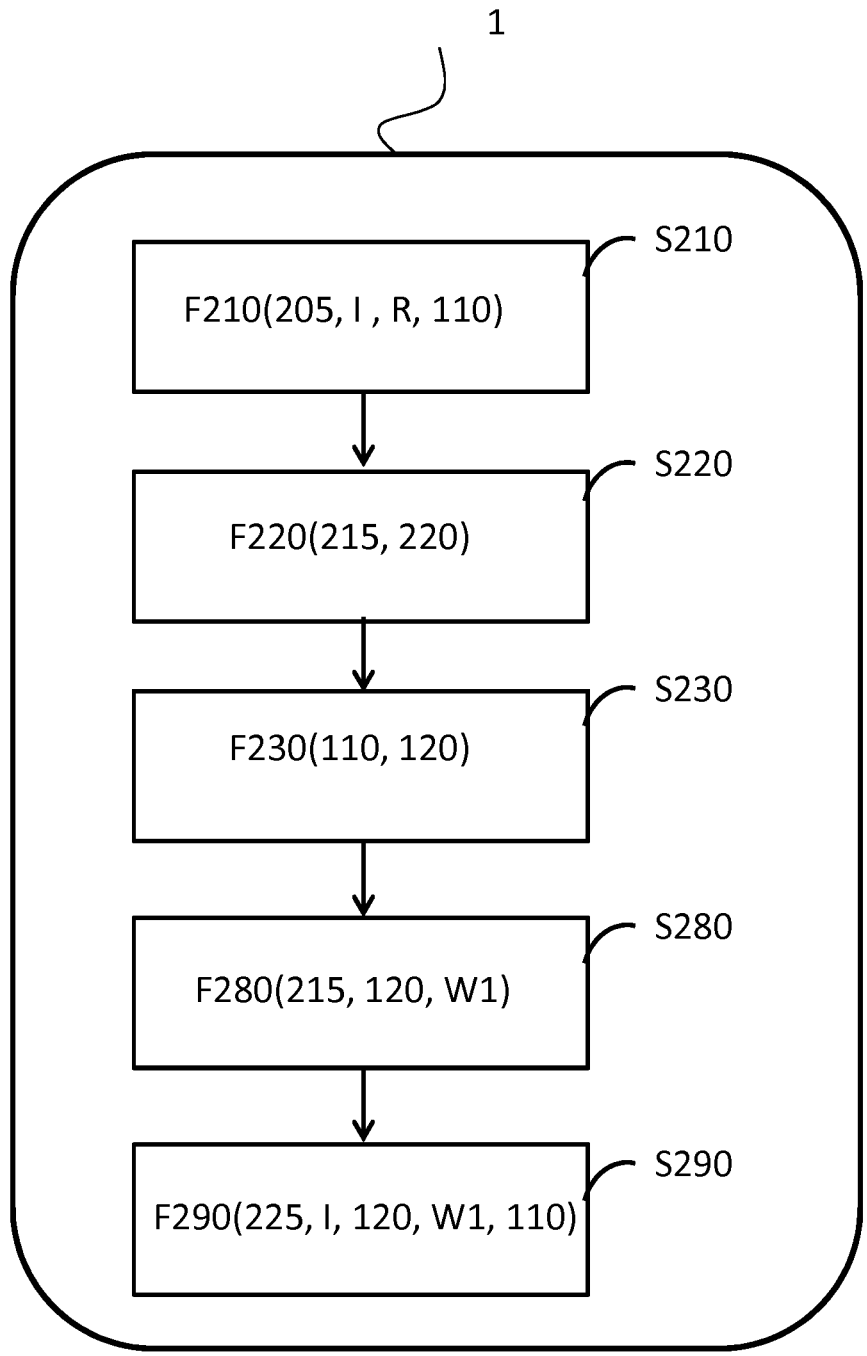

FIG. 5 is a flowchart of a method carried out by the lighting system of FIG. 3b, in accordance with an embodiment of the present invention.

Figure 6:
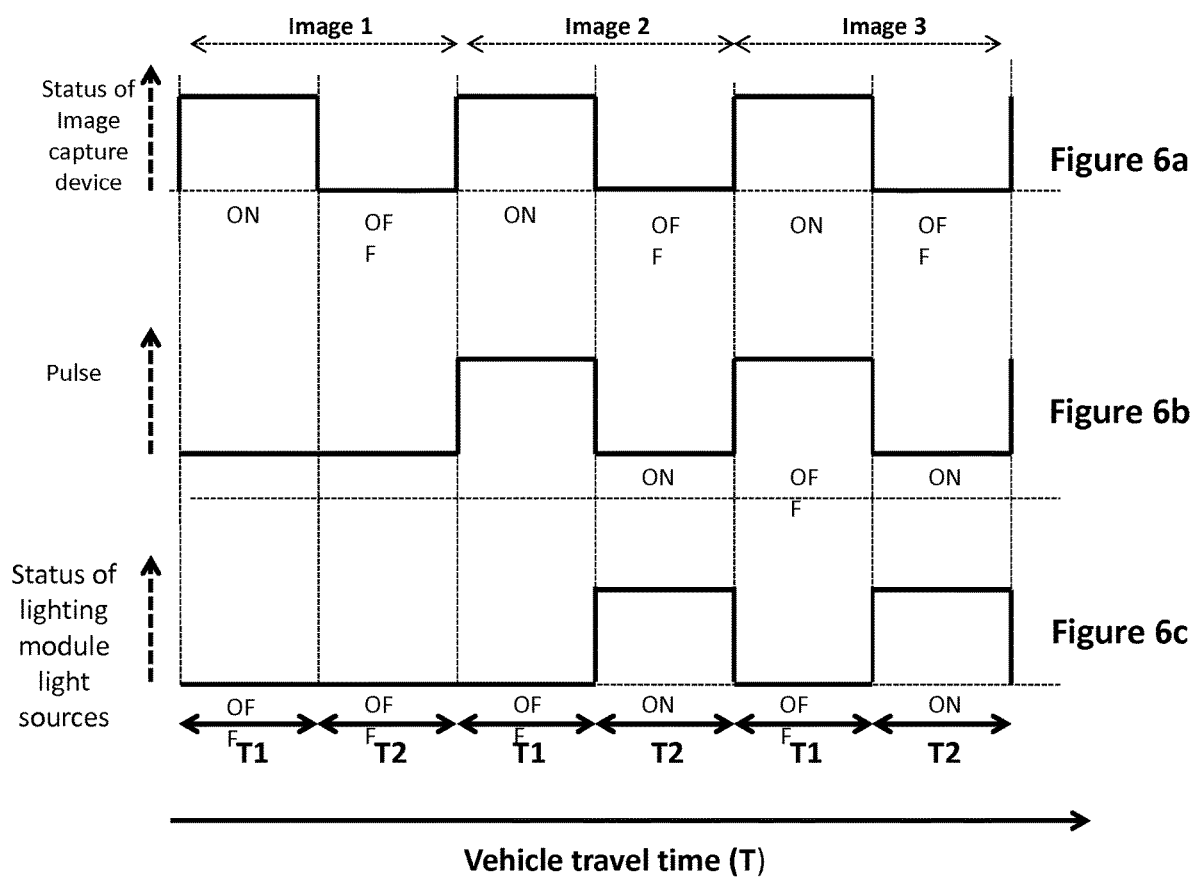

FIG. 6a to FIG. 6c shows temporal progresses of signals, in accordance with an embodiment of the present invention.

Figure 7:
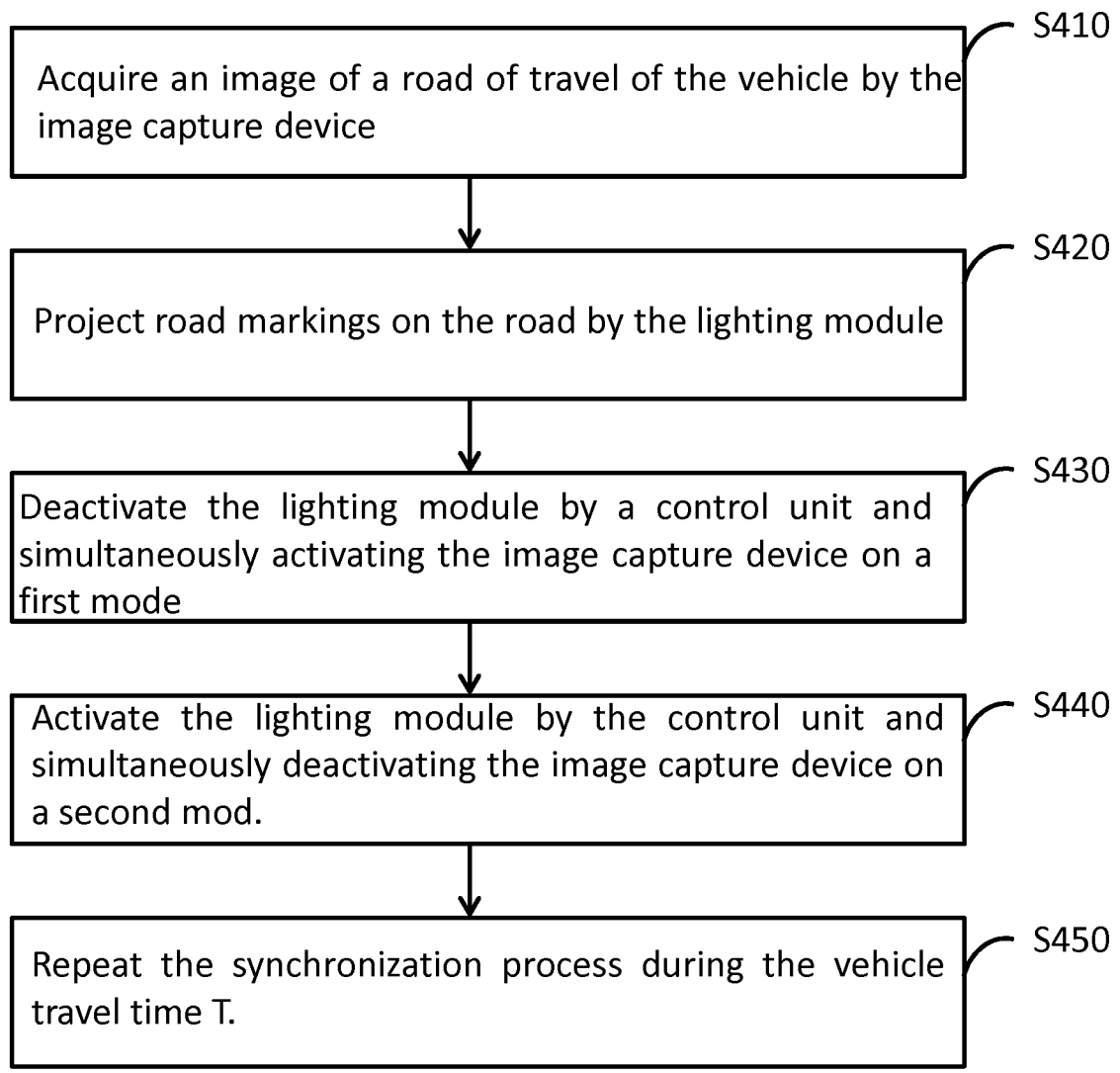

FIG. 7 is a flowchart of a method for synchronizing operations of a lighting module and an image capture device coupled to the automotive vehicle carried out by the lighting system of FIG. 3c, in accordance with an embodiment of the present invention.

DETAILED DESCRIPTION OF THE INVENTION

The following detailed description describes various features and functions of the disclosed systems and methods with reference to accompanying figures. The illustrative system and method embodiments are not meant to be limiting. It may be readily understood that certain aspects of the disclosed systems and methods can be arranged and combined in wide variety of different configurations, all of which are contemplated herein.

Autonomous vehicles operating on road may rely on identifying lane boundaries or lane markings on the road for navigation. A computing device, i.e., Advanced Driver Assistance Systems (ADAS), configured to control the vehicle may be configured to have access to the road information that may indicate the lane boundaries on the road. Usually, an image capture device coupled to the vehicle captures an image of road of travel of the vehicle and the image is further processed to identify the lane boundaries on the road. However, in some cases, the captured road information may include inaccuracies in estimation of lane boundaries. For example, during night time, frontal headlights of the vehicle may project road markings, for example, lanes on the road, and the road information captured by the image capture device may include the information related to the projected road markings along with the lane boundaries or lane markings on the road. This may create confusion to the computing device to identify the lane boundaries or the lane markings on the road for navigation.

The present subject matter relates to a lighting system and a synchronization method for differentiating lanes marked on the road and road markings projected by a lighting module of the automotive vehicle.

Figure 2:
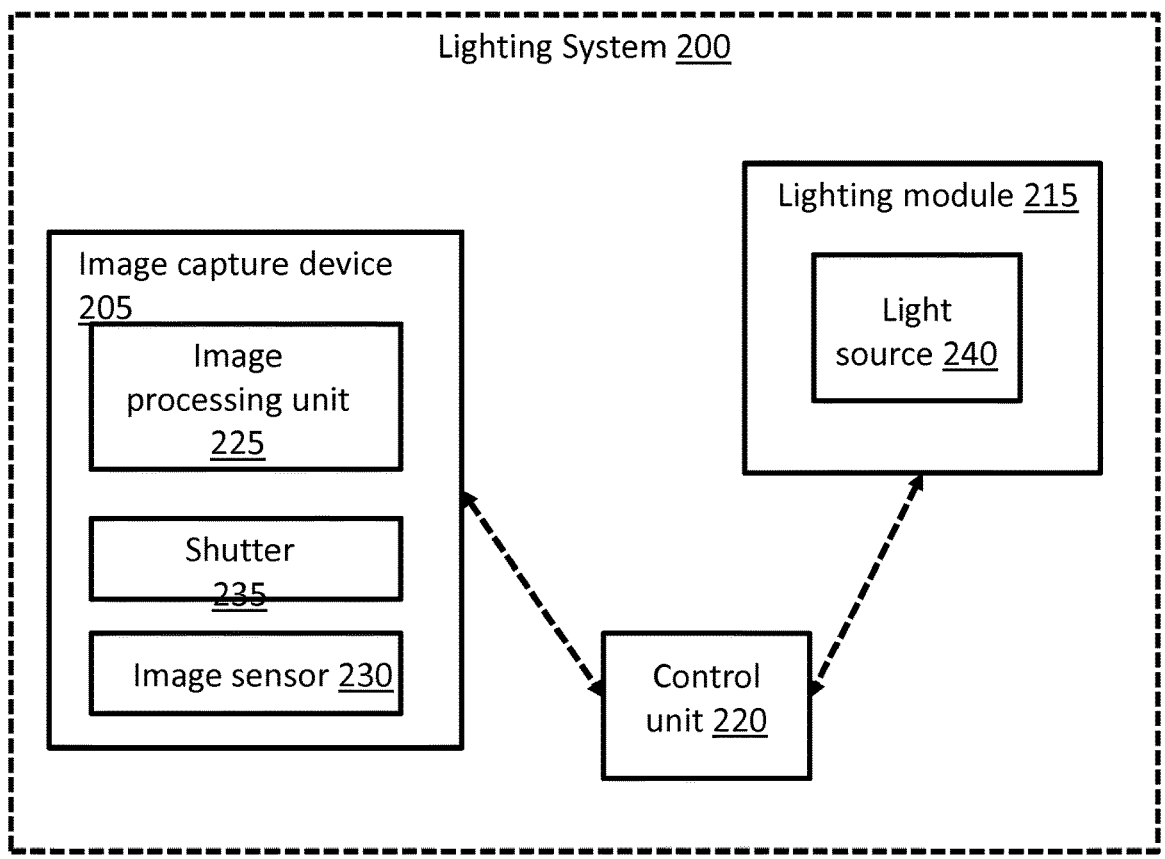
FIG. 2 is a schematic illustration of a block diagram of a lighting system of an automotive vehicle, said lighting system comprising an image capture device, a lighting module and a control unit, in accordance with an embodiment of the present invention.

FIG. 2 is a schematic illustration of a block diagram of a lighting system of a motor vehicle, in accordance with an embodiment of the present invention. The motor vehicle, for example, is a passenger car.

The lighting system 200 as shown in the FIG. 2 comprises an image capture device 205 configured to acquire an image of a road R (illustrated in FIG. 1) of travel of the vehicle (function f1 illustrated in FIGS. 3a to 3c), said road R comprising lanes marked 110 (illustrated in FIG. 1) on the road; a lighting module 215 configured to project road markings 120 (illustrated in FIG. 1) on the road (function f2 illustrated in FIGS. 3a to 3c); and a control unit 220.

In an aspect, the image capture device 205 may be any camera (e.g., a still camera, a video camera) configured to capture the image of the road of the travel of the vehicle. In an aspect, the image capture device 205 is coupled to the vehicle and may be positioned behind a rear view mirror of the vehicle, or positioned at a front bumper of the vehicle.

Figure 1:
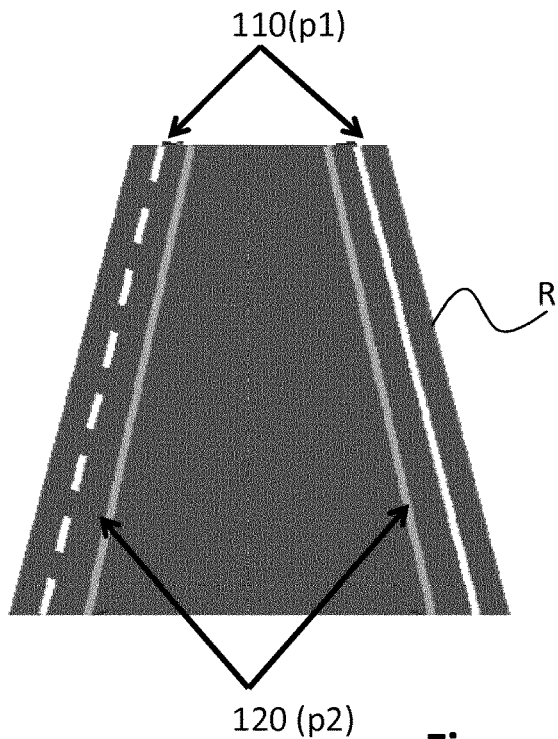
FIG. 1 shows a schematic illustration of an automotive vehicle with lanes marked on a road and projected road markings by a lighting module of the automotive vehicle, in accordance with an embodiment of the present invention.

Further, in an embodiment, the image capture device 205 includes an image-processing unit 225 to process the captured images to compute position p1 of lanes marked 110 on the road illustrated in FIG. 1 (function f3 illustrated in FIGS. 3a to 3c), an image sensor 230 by means of which the images of the road are captured, and a shutter 235. In particular, the image processing unit 225 computes coordinates of the lanes marked 110 on the road.

The shutter 235 serves for covering the image sensor 230 against the environmental region. The shutter 235 can be moved back and forth between an open position and a closed position. The image sensor 230 is electrically coupled to the image-processing unit 225.

In an embodiment, the image capture device 205 may be electrically coupled to the lighting module 215. The lighting module 215 includes at least a light source 240 and the lighting module 215 is configured to project a segmented lighting beam (function f4 illustrated in FIGS. 3a to 3c). The segmented lighting beam is a beam with a plurality of segments, which are selectively activable to project road markings such as lines. In a first example, the lighting module 215 comprises a matrix of micro-mirrors. The micro-mirrors can be switched between two angles. In a first angular position, the light received from the light source 240 of the lighting module 215 is reflected in a first direction and contributes to form the lighting beam. In a second angular position, the light received is reflected in a second direction and does not contribute to form the lighting beam.

In a second example, the light source 240 of the lighting module 215 is a laser light source such as a laser diode and the lighting module 215 comprises a light conversion means on which the light emitted from the laser light source is directed. The laser light source scans the light conversion means to draw an image which is projected to form the lighting beam.

In a third example, the lighting module 215 comprises a plurality of light sources. Each light source is associated with an optical element to form a light segment. Each light segment is projected by a projection element to form the lighting beam.

In a fourth non-limitative example, the light source 240 of the lighting module 215 is of any type of LED.

In fifth non-limitative example, the light source 240 of the lighting module 215 is an infrared light source.

The lighting system 200 is further described according to three non-limitative embodiments in reference to respectively FIGS. 3a, 3b and 3c.

In a first non-limitative embodiment illustrated in FIG. 3a, the control unit 220 is configured to compute position p2 of road markings 120 to be projected on the road based on the position p1 of lanes marked 110 on the road (function f5 illustrated in FIG. 3a). In particular, the control unit 220 computes coordinates of the road markings 120.

The control unit 220 is further configured to send said position p2 of road markings 120 to be projected on the road to said image processing unit 225 (function f6 illustrated in FIG. 3a).

Upon receiving said position p2, the image processing unit 225 integrates said position p2 of road markings 120 to be projected on the road in order to differentiate between the lanes 110 marked on the road and the projected road markings 120 on the road (function f7 illustrated in FIG. 3a). As the position p1 of lanes marked 110 on the road is known by the image processing unit 225, said image processing unit 225 can differentiate the projected road markings 120 from the lane markings 110 on the road thanks to the different position p1 and p2, in particular to the different coordinates. Therefore, when the image capture device 205 acquires an image I of the road R, it acquires the lanes marked 110 on the road and the projected road markings 120 on the road, then thanks to the position p1 and the position p2, it filters the projected road markings 120 on the road, so that these latter are not taken into account for the management of the control commands of the ADAS. Hence, it avoids confusion between the lanes marked 110 on the road and the projected road markings 120.

In a second non-limitative embodiment illustrated in FIG. 3b, the lighting module 215 is configured to project road markings 120 on the road (function f2 illustrated in FIG. 3b) using a pulse light beam W1, and the image processing unit 225 is further configured to identify within said image I the projected road markings 120 on the road corresponding to the pulse light beam W1 (function f8 illustrated in FIG. 3b) in order to differentiate between the lanes marked 110 on the road and the projected road markings 120 on the road.

The pulse light beam W1 is generated by the lighting module 215, in particular by the light source 240 not emitting a light beam continuously. Said pulse light beam W1 is created by a succession of light pulses, most often generated by a frequency modulated electrical signal supplying the light source 240 emitting said light beam.

During a short period of time, between each transmitted light pulse, the repetition of which is periodic, the light beam is no longer emitted. The pulsed character of a light beam is thus necessarily translated by an interruption, very limited in time, of the light beam considered. Such an interruption, which is advantageously invisible to a human—either by the frequency of pulsation, sometimes also designated as modulation frequency, chosen—or by the use of invisible rays, for example infrared, results in a blinking, invisible for the human eye.

Hence, the image processing unit 225 is configured to:
differentiate pulsed light zones corresponding to projected road markings 120 on the road, of non-pulsed zones corresponding to the lanes marked 110 on the road (function f10 illustrated in FIG. 3b),
reject the pulsed light zones (function f11 illustrated in FIG. 3b),
remember the non-pulsed zones (function f12 illustrated in FIG. 3b),
communicate, to the control unit 220, information on the non-pulsed zones (function f13 illustrated in FIG. 3b). These information will be used for the management of control commands of the ADAS.

Hence, the image processing unit 225 filters the projected road markings 120 on the road thanks to the pulse light beam W1, so that these latter are not taken into account for the management of the control commands of the ADAS. Hence, it avoids confusion between the lanes marked 110 on the road and the projected road markings 120.

It is to be noted that the image capture camera 205 is set up so that the image processing unit 225 is able to identify the projected road markings 120 emitted in a pulsed manner. Indeed, the reflections of the projected road markings 120 will be reflected, on the images I of the road captured by the image capture device 205, by a regular flicker. On the contrary, the lanes marked 110 do not result in a blinking because it is present on all the images I captured by the image capture device 205.

In a non-limitative embodiment, the image capture device 205 has an acquisition frequency fq1 of the images I, and the lighting module 215 has a pulsation frequency fq2 (of the projected road markings 120) lower than said acquisition frequency fq1. Hence, for example in two consecutive images I acquired by the image capture device 205, the lanes marked 110 on the road will always appear, whereas, the projected road markings 120 will appear only in one image I, and not in the subsequent image I. The image processing unit 225 is thus able to automatically discriminate between the lanes marked 110 and the projected road markings 120. It avoids confusion between both different markings.

In a non-limitative embodiment, the lighting module 215 emits in the frequencies belonging to the visible spectrum so that the projected road markings 120 are visible by the driver; it is powered by a voltage having a very high duty cycle, for example of the order of ninety percent—that is to say that the pulse light beam W1 is interrupted ten percent of the total emission time, which can be achieved in particular with LEDs in a non-limitative embodiment, so as not to diminish the overall lighting performance of the vehicle under consideration. In a non-limitative embodiment, the pulsation frequency fq2 is a sub-multiple of the acquisition frequency fq1. In a non-limitative example, the pulsation frequency fq2 is of 15 Hertz, and the acquisition frequency fq1 is of 30 Hertz, or 30 images per second. By sub-multiple of a number, one designates a value obtained by the division of the number considered by a natural integer. A pulsation frequency of 15 Hertz refers to the fact that the lighting module 225 producing the pulse light beam W1 emits fifteen pulses per second. More generally, the pulsation frequency fq2 of the lighting module 225 is chosen to be a frequency lower than the acquisition frequency fq1 of the image capture device 205. It is thus certain to obtain a flash (also called blinking) at a given moment on all captured images I. Choosing a sub-multiple for the pulsation frequency fq2 permits to observe this blinking, very regularly, and on a limited number of consecutive images I. In the example taken here, the blinking is observed every two images.

It is to be noted that the pulsation frequency fq2 used is known to the image processing unit 225. Such knowledge makes it possible to overcome the risk of misinterpreting signals from external modulated light sources, for example those of other equivalent vehicles than the one considered.

In a third non-limitative embodiment illustrated in FIG. 3c, the control unit 220 is configured to deactivate the lighting module 215 (function illustrated f20 in FIG. 3c) and to activate simultaneously the image capture device 205 (function illustrated f21 in FIG. 3c) on a first mode, and further configured activate the lighting module 215 (function illustrated f22 in FIG. 3c) and to deactivate simultaneously the image capture device 205 (function illustrated f23 in FIG. 3c) on a second mode.

In a non-limitative embodiment, the control unit 220 is further configured to compute position p2 of road markings 120 to be projected on the road based on the position of lanes marked 110 on the road (function f5 illustrated in FIG. 3c). In particular, the control unit 220 computes coordinates of the road markings 120.

The control unit 220 is further configured to send said position p2 of road markings to be projected on the road 120 to said image processing unit 225 (function f6 illustrated in FIG. 3c).

As previously mentioned, the image capture device 205 is configured to operate in the first mode and in the second mode. In an embodiment, the image capture device 205 is configured to operate in the first mode for the predetermined time interval T1 and in the second mode for the predetermined time interval T2. The shutter 235 of the image capture device 205 is moved back and forth between the open position and the closed position in the first mode and in the second mode to activate and deactivate the operation of the image capture device 205. To synchronise the operation of the image capture device 205 and the lighting module 215, the movement of the shutter 235 occurs synchronously with the switching of the lighting module 235, during the vehicle travel time T.

The image capture device 205 operates in a pulsed manner in which acquisition of an image is activated during the predetermined time interval T1 and the acquisition of image is deactivated during the predetermined time interval T2, the time interval T1 is followed by the time interval T2 on a sequential manner.

The periodic switching of the image capture device 205 is illustrated in the FIG. 3a during vehicle travel time T. The operation of the image capture device 205 is toggled between the state "0" and state "1". The state "0" is inactive state, in which the image capture device 205 is deactivated, i.e., turned OFF. In contrast, in the state "1" and thus in active state, the image capture device 205 is activated, i.e., turned ON.

In an embodiment, the control unit 220 is configured to synchronize the operations of the image capture device 205 and the lighting module 215. For example, the control unit 220 is a driver of the lighting module 215. In case where the lighting module 215 is positioned in a headlamp, the control unit 220 can be the driver of the headlamp. The control unit 220 is configured to send either an activation signal or a deactivation signal to the lighting module 215 upon receiving a synchronization signal from the image capture device 205.

In the first mode, the image capture device 205 is configured to send a synchronization signal to the control unit 220 on the rising edge of the pulse. Further, the control unit 220 is configured to send a deactivation signal to the lighting module 205 upon receiving the synchronization signal, and the image capture device 205 is configured to acquire image during the predetermined time interval T1. The time interval T1 corresponds to integration time, which is the duration of the capture of the image. The captured image is processed by the image-processing unit 225 to compute position of lanes 210 marked on the road. In particular, the image processing unit 225 computes coordinates of the lanes 110 marked on the road. The computation of the coordinates of the lanes marked on the road by processing the image is well known to a person skilled in the art, and therefore details of the computation are not provided herein. Further, the coordinates of the lanes 110 marked on the road are sent to the control unit 220 by the image-processing unit 225.

Whereas, in the second mode, the image capture device 205 is configured to send a synchronization signal to the control unit 220 on the falling edge of the pulse. The control unit 220 is configured to send an activation signal to the lighting module 205 upon receiving the synchronization signal, and the lighting module 205 is configured to project road markings on the road during the predetermined time interval T2. The lighting module 205 projects the markings on the road based on the computed coordinates of the lanes. The time interval T2 corresponds to operational time of the lighting module 205. The time interval T2 is dimensioned such that driver of the vehicle can always view the lanes 110 marked on the road, without any blinking According to an embodiment of the present invention, the values of the preset time intervals T1 and T2 are within in a range from about 14 ms to about 66 ms. i.e., the image capture device 205 and the lighting module 215 are switched with a frequency within a range from about 15 Hz to about 70 Hz between an active state and an inactive state. In another embodiment, the values of time intervals T1 and T2 are equal to 50 ms, i.e., the image capture device 205 and the lighting module 215 are switched with a frequency of 50 Hz between an active state and an inactive state. The preset time intervals T1 and T2 are selected in the above mentioned ranges so that the blinking is not visible to the human eyes, and thereby the driver and the passengers can see a continuous light.

The image capture device 210 is operated synchronously with the lighting module 215, during the vehicle travel time T, such that during the operation of the image capture device 205, the lighting module 210 do not projects road markings 120 on the road and thereby lanes 110 marked on the road can be identified without any confusion. Therefore, in autonomous vehicles, the ADAS system that pilots the vehicle can easily identify the lanes 120 marked on the road for navigation. Similarly, by projecting road markings 120 based on the identification of lanes 110 marked on the road, the driver of the automated vehicles can easily identify whether there is enough space to pass or overtake other vehicles, and thereby occurrence of accidents can be prevented.

With reference now to FIG. 6a to FIG. 6c, the operation of the synchronization of the image capture device 205 and the lighting module 215, according to an embodiment of the present subject matter, is explained in more detail. In the FIG. 6a, the operation of the image capture device 205, and thus a temporal progress of the state of the image capture device 205 are illustrated. In particular, the temporal progress of the movement of the shutter of the image capture device, the shutter is moved between the open position and the closed position is illustrated in the FIG. 6a. In the FIG. 6b, the temporal progress of a pulse is illustrated. In the FIG. 6c, a temporal progress of the operation of the lighting module 215 is illustrated.

As already explained with reference to the FIG. 2, the image capture device 205 operates in the first mode and in the second mode during the vehicle travel time T such that during the operation of the image capture device 205, the lane markings 120 are not projected on the road by the lighting module 210.

In an embodiment, at the start of the synchronization process, light sources 240 in the lighting module 215 may be switched OFF for a certain time period. As apparent from the FIG. 6a and the FIG. 6c, at the start of the synchronization process, during the capture and process of a first image, the light sources are switched OFF for a certain time period. The predetermined time interval T1 corresponds to integration time i.e., the time required to capture the image and the time interval T2 corresponds to processing time of the image captured during T1. The processing of the image includes computing coordinates of lanes 110 marked on the road and sending the computed coordinates of the lanes marked on the road to the control unit 220.

After elapse of the time duration for capturing and processing the first image, the image capture device 205 sends the computed coordinates of lanes marked on the road from the first image to the control unit 220.

Subsequently, capturing of second image begins for the time interval T1 and the control unit 220 computes coordinates of road markings to be projected in the time interval T1, based on the coordinates of the lanes marked in the first image. In an embodiment, on a raising edge of a pulse, the image capture device 205 sends a synchronization signal to the control unit 220, and the image capture device 205 captures the second image during the time interval T1. The control unit 220 in turn sends a deactivation signal to the lighting module to deactivate the lighting module during the raising edge of the pulse. Further, on a falling edge of the pulse, the image capture device 205 sends a synchronization signal to the control unit 220, and the control unit 220 sends an activation signal to the lighting module 205.

During the process time of the second image, the lighting module 205 is activated to project the road markings on the road based on the coordinates of lanes computed from the first image. During the capturing of the second image, i.e., integration time, the lighting module 215 is deactivated in order to not to project road markings while image capturing. Similarly, as apparent from the FIG. 6a and the FIG. 6c, during the process time of the third image, the lighting module 215 is activated based on coordinates of projected lanes computed from the second image; and during the integration time of the third image, the lighting module 215 is deactivated.

Thus, during the vehicle travel time T, the lighting module 215 operate in synchronism with the image capture device 205 such that deactivation of the lighting module 215 coincides with the activation of the image capture device 205, and vice versa, which is apparent from the FIG. 6a and the FIG. 6c.

The lighting system 200 is configured to carry out a method 1, said method 1 comprising the following steps, as illustrated in FIGS. 4 and 5:
- in step S210 illustrated F210(205, I, R, 110), acquiring an image I of a road R of travel of the vehicle by the image capture device 205, said road R comprising lanes marked 110 on the road;
- in step S220 illustrated F220(215, 120), projecting road markings on the road 120 by the lighting module 215; and
- in step S230 illustrated F230(110, 120), a filtering of the projected road markings 120 on the road compared to the lanes marked 110 on the road.

According to a first non-limitative embodiment illustrated in FIG. 4, said method 1 further comprises:
- in step S240 illustrated F240(225, p1), computing a position p1 of lanes marked on the road 110 by an image processing unit 225 within said image capture device 205;
- in step S250 illustrated F250(220, p2), computing a position p2 of road markings to be projected on the road 120 based on the position of lanes marked on the road 110 by a control unit 220.
- in step S260 illustrated F260(220, 225, p2), sending from said control unit 220 said position p2 of road markings to be projected on the road 120 to said image processing unit 225, and
- in step S270 illustrated F270(225, p2, 110, 120), integrating by said image processing unit 225 said position p2 of road markings to be projected on the road 120 in order to differentiate between the lanes marked on the road 110 and the projected road markings on the road 120.

According to a second non-limitative embodiment illustrated in FIG. 5, said method 1 further comprises:
- in step S280 illustrated F280(215, 120, W1), projecting road markings 120 on the road using a pulse light beam W1 by said lighting module 215;
- in step S290 illustrated F290(225, I, 120, W1, 110), identifying within said image I the projected road markings 120 on the road corresponding to the pulse light beam W1 by the image processing unit 225 within said image capture device 205 in order to differentiate between the lanes marked 110 on the road and the projected road markings 120 on the road.

In a non-limitative embodiment, the image capture device 205 has an acquisition frequency fq1, and the lighting module 215 has a pulsation frequency fq2 lower than said acquisition frequency fq1.

In a non-limitative embodiment, the pulsation frequency fq2 is a sub-multiple of the acquisition frequency fq1.

FIG. 7 is a flowchart of a method 2 for synchronizing operations of a lighting module 215 of an automotive vehicle and an image capture device 205 coupled to the motor vehicle, in accordance with an embodiment of the present invention. Steps of the method are described with reference to the components depicted in the FIG. 2. Additional, different, or fewer steps may be provided. Steps may be performed in orders other than those presented herein. As explained earlier with reference to the FIG. 2, the image capture device 205 operates in the first mode and in the second mode synchronously with the operation of the lighting module.

In step S410, the image capture device 205 acquires an image of a road of travel of the vehicle for a time interval T1. In step S420, the lighting module 215 projects road markings on the road. In step S430, the method comprises deactivating the lighting module 215 by a control unit 220 and simultaneously activating the image capture device 205 on a first mode. In step S440, the method comprises activating the lighting module 215 by the control unit 220 and simultaneously deactivating the image capture device 205 on a second mode.

In the first mode, the image capture device 205 is configured to send a synchronization signal to the control unit 220 on the rising edge of the pulse. Further, the control unit 220 is configured to send a deactivation signal to the lighting module 205 upon receiving the synchronization signal, and the image capture device 205 is configured to acquire image during the time interval T1. The time interval T1 corresponds to integration time, which is the duration of the capture of the image. The captured image is then processed by the image-processing unit 225 to compute position of lanes 210 marked on the road. In particular, the image processing unit 225 computes coordinates of the lanes 110 marked on the road. The computation of the coordinates of the lanes marked on the road by processing the image is well known to a person skilled in the art, and therefore details of the computation are not provided herein. Further, the coordinates of the lanes 110 marked on the road are sent to the control unit 220.

Whereas, in the second mode, the image capture device 205 is configured to send a synchronization signal to the control unit 220 on the falling edge of the pulse. The control unit 220 is configured to send an activation signal to the lighting module 205 upon receiving the synchronization signal, and the lighting module 205 is configured to project road markings on the road during the predetermined time interval T2. The lighting module 215 projects the markings on the road based on the computed coordinates of the lanes. The time interval T2 corresponds to operational time of the lighting module. The time interval T2 is dimensioned such that driver of the vehicle can always view the lanes 110 marked on the road, without any blinking In step S450, the process of the synchronization between the lighting module 210 and the image capture device 205 is repeated during the vehicle travel time T.

Thus, the image capture device 210 is operated synchronously with the lighting module 215 such that during the operation of the image capture device 205, the lighting module 210 does not road markings 120 on the road and thereby lanes 110 marked on the road can be identified without any confusion. Therefore, in autonomous vehicles, the ADAS system that pilots the vehicle can easily identify the lanes 120 marked on the road for navigation. Similarly, by projecting road markings 120 based on the identification of lanes 110 marked on the road, the driver of the automated vehicles can easily identify whether there is enough space to pass or overtake other vehicles, and thereby occurrence of accidents can be prevented.

It is to be understood that the present invention is not limited to the aforementioned embodiments and variations and modifications may be made without departing from the scope of the invention. In the respect, the following remarks are made. Hence, in a non-limitative embodiment, the road markings 120 may be projected by the lighting module 215 via a pulse light beam W1 also for:

the first non-limitative embodiment, where the position p2 of the projected road marking 120 is used to differentiate the projected road markings 120 and the lanes marked 110 on the road, and the third non-limitative embodiment, where the lighting module 215 is deactivated while the image capture device 205 is activated and viceversa.

The invention claimed is:

1. A lighting system of an automotive vehicle, the lighting system comprising:
   a lighting device that includes a light source, the lighting device being configured to project road markings on a road of travel of the vehicle using a pulse light beam; and
   image capture circuitry configured to
      acquire an image of the road of travel of the vehicle, the road including lanes marked on the road, and the image including the projected markings on the road and the lanes marked on the road,
      identify within said image the projected road markings on the road corresponding to the pulse light beam,
      differentiate pulsed light zones corresponding to the projected road markings on the road from non-pulsed zones corresponding to the lanes marked on the road, and
      remove the projected road markings on the road from the image.

2. The lighting system according to claim 1, further comprising:
   control circuitry, wherein
   the image capture circuitry is configured to compute position of lanes marked on the road, and
   the control circuitry is configured to compute position of road markings to be projected on the road based on the position of lanes marked on the road.

3. The lighting system according to claim 2, wherein the control circuitry is further configured to send said position of road markings to be projected on the road to said image capture circuitry, and
   the image capture circuitry integrates said position of road markings to be projected on the road in order to differentiate between the lanes marked on the road and the projected road markings on the road.

4. The lighting system according to claim 1, wherein the image capture circuitry has an acquisition frequency, and
   the lighting device has a pulsation frequency lower than said acquisition frequency.

5. The lighting system according to claim 4, wherein the pulsation frequency is a sub-multiple of the acquisition frequency.

6. The lighting system according to claim 1, further comprising control circuitry configured to:
   deactivate the lighting device and to activate simultaneously the image capture circuitry on a first mode, and
   activate the lighting device and to deactivate simultaneously the image capture circuitry on a second mode.

7. The lighting system according to claim 6, wherein
   the image capture circuitry is configured to compute position of lanes marked on the road, and
   the control circuitry is configured to compute position of road markings to be projected on the road based on the position of lanes marked on the road.

8. The lighting system according to claim 6, wherein the pulse light beam is a segmented lighting beam.

9. The lighting system according to claim 6, wherein the image capture circuitry operates in a pulsed manner in which acquisition of an image is activated during a predetermined time interval T1 and the acquisition of image is deactivated during a predetermined time interval T2, the time interval T1 is followed by the time interval T2 on a sequential manner.

10. The lighting system according to claim 9, wherein the image capture circuitry is configured to operate in the first mode for the predetermined time interval T1 and in the second mode for the predetermined time interval T2.

11. The lighting system according to claim 9, wherein the image capture circuitry is configured to activate the first mode on a rising edge of a pulse and to activate the second mode on a falling edge of the pulse, a pulse duration corresponding to the predetermined time interval T1.

12. The lighting system according to claim 11, wherein on the first mode, the image capture circuitry is configured to send a synchronization signal to the control circuitry on the rising edge of the pulse and the control circuitry is configured to send a deactivation signal to the lighting device upon receiving the synchronization signal, and the image capture circuitry is configured to acquire image during the time interval T1.

13. The lighting system as claimed in claim 11, wherein on the second mode, the image capture circuitry is configured to send a synchronization signal to the control circuitry on the falling edge of the pulse and the control circuitry is configured to send an activation signal to the lighting device upon receiving the synchronization signal, and the lighting device is configured to project road markings on the road during the predetermined time interval T2.

14. The lighting system according to claim 9, wherein values of the time intervals T1 and T2 are within in a range from about 14 ms to 66 ms.

15. A method comprising:
   projecting, by a lighting device that includes a light source, road markings on a road of travel of a vehicle using a pulse light beam;
   acquiring, by image capture circuitry, an image of the road of travel of the vehicle, the road including lanes marked on the road, and the image including the projected markings on the road and the lanes marked on the road;
   identifying, by the image capture circuitry, within said image the projected road markings on the road corresponding to the pulse light beam;
   differentiating, by the image capture circuitry, pulsed light zones corresponding to the projected road markings on the road from non-pulsed zones corresponding to the lanes marked on the road; and removing, by the image capture circuitry, the projected road markings on the road from the image.

16. The method according to claim 15, further comprising:

computing, by the image capture circuitry, a position of lanes marked on the road; and computing, by control circuitry, a position of road markings to be projected on the road based on the position of lanes marked on the road.

17. The method according to claim 16, further comprising:

sending, from said control circuitry, said position of road markings to be projected on the road to said image capture circuitry; and integrating, by said image capture circuitry, said position of road markings to be projected on the road in order to differentiate between the lanes marked on the road and the projected road markings on the road.

18. A method for synchronizing an operation of a lighting device, which includes a light source, of a vehicle with image capture circuitry, the method comprising:

acquiring, by the image capture circuitry, an image of a road of travel of the vehicle;

projecting, by the lighting device, road markings on the road using a pulse light beam;

identifying, by the image capture circuitry, within said image the projected road markings on the road corresponding to the pulse light beam;

differentiating, by the image capture circuitry, pulsed light zones corresponding to the projected road markings on the road from non-pulsed zones corresponding to lanes marked on the road;

removing, by the image capture circuitry, the projected road markings on the road from the image;

deactivating, by control circuitry, the lighting device and simultaneously activating the image capture circuitry on a first mode; and activating, by control circuitry, the lighting device and simultaneously deactivating the image capture circuitry on a second mode.

19. The method according to claim 18, further comprising:

computing position of lanes marked on the road and computing position of road markings to be projected on the road based on the position of lanes marked on the road.

20. The method according to claim 18, further comprising:

operating the image capture circuitry in a pulsed manner in which acquisition of an image is activated during a predetermined time interval T1 and the acquisition of image is deactivated during a predetermined time interval T2, the time interval T1 is followed by the time interval T2 on a sequential manner.

21. The method according to claim 20, further comprising:

operating the image capture circuitry in the first mode for the predetermined time interval T1; and operating the image capture circuitry in the second mode for the predetermined time interval T2.

22. The method according to claim 20, further comprising:

activating the first mode by the image capture circuitry, on a rising edge of a pulse; and activating the second mode by the image capture circuitry on a falling edge of the pulse, a pulse duration corresponding to the predetermined time interval T1.

23. The method according to claim 22, wherein operating the image capture circuitry on the first mode comprises:

sending, by the image capture circuitry, a synchronization signal to the control circuitry on a raising edge of the pulse;

sending, by the control circuitry, a deactivation signal to the lighting device, upon receiving the synchronization signal; and acquiring the image, by the image capture circuitry, during the predetermined time interval T1.

24. The method according to claim 22, wherein operating the image capture circuitry in the second mode comprises:

sending, by the image capture circuitry, a synchronization signal to the control circuitry on the falling edge of the pulse;

sending, by the control circuitry, an activation signal to the lighting device, upon receiving the synchronization signal; and projecting, by the lighting device, the road markings on the road during the predetermined time interval T2.

25. The lighting system according to claim 9, wherein an operation of the image capture circuitry is toggled between a state 0 and a state 1, the state 0 is an inactive state, in which the image capture circuitry is turned off, and the state 1 is an active state, in which the image capture circuitry is turned on.

* * * * *